Jan. 7, 1964  D. L. SCOTT  3,116,666
ROTARY ENGINE

Filed Feb. 15, 1961  7 Sheets-Sheet 1

INVENTOR:
DEWEY L. SCOTT
By Bedell and Burgess
ATTORNEYS

INVENTOR:
DEWEY L. SCOTT
By Bedell and Burgess
ATTORNEYS

Jan. 7, 1964  D. L. SCOTT  3,116,666
ROTARY ENGINE

Filed Feb. 15, 1961  7 Sheets-Sheet 4

Fig. 8.

INVENTOR:
DEWEY L. SCOTT
By Bedell and Burgess
ATTORNEYS

Jan. 7, 1964 D. L. SCOTT 3,116,666
ROTARY ENGINE

Filed Feb. 15, 1961 7 Sheets-Sheet 5

INVENTOR:
DEWEY L. SCOTT
By Bedell and Burgess
ATTORNEYS

Jan. 7, 1964

D. L. SCOTT

3,116,666

ROTARY ENGINE

Filed Feb. 15, 1961

INVENTOR:
DEWEY L. SCOTT
By Bedell and Burgess
ATTORNEYS

Jan. 7, 1964

D. L. SCOTT 3,116,666

ROTARY ENGINE

Filed Feb. 15, 1961

INVENTOR:
DEWEY L. SCOTT
By Bedell and Burgess
ATTORNEYS

United States Patent Office 3,116,666
Patented Jan. 7, 1964

3,116,666
ROTARY ENGINE
Dewey L. Scott, 4708 Blackhawk Drive, Affton, Mo.
Filed Feb. 15, 1961, Ser. No. 89,654
12 Claims. (Cl. 91—92)

The invention relates to rotary engines suitable for operation with pressurized fluid such as steam, compressed air or other gas, or liquids under pressure.

It is an object of the invention to provide an engine of this type in which a plurality of overlapping impulses may be delivered to the rotor during each revolution whereby the rotor will deliver a continuous substantially constant torque.

Another object is to provide an engine of this type which may be assembled from laminations each suitably grooved, slotted, or recessed to form the necessary fluid passageways.

Other objects and advantages will be apparent during the course of the following description.

The normal direction of rotation of the engine will be taken as counterclockwise throughout the following description, and the terms "forward" and "rear," "trailing" and "leading" will be used in this sense.

The engine comprises a stator or housing 1 of substantially triangular cross section laminated from a plurality of plates. The central plate 3 has a trifoliate opening with a relatively large circular central portion 5 and three smaller circular portions 6, 7 and 8 intersecting the periphery of the central portion and equally spaced around it. A rotor 10 with a cylindrical body 10a of substantially less diameter than the opening central portion 5 is received therein and is provided with four equally-spaced, radially-extending vanes 11, 12, 13 and 14, the outer surfaces of which are arcuate and of substantially the same diameter as the opening central portion 5 so as to be capable of rotating in central portion 5, yet effecting a seal with its periphery.

Plate 3 is abutted on both sides by plates 16a and 16b, which, together with plate 3, form the rotor chamber, and plates 16a and 16b, in turn are adjoined by inlet and exhaust plates 18a and 18b. Sealing plates 20a and 20b are secured to the outer surfaces of plates 18a and 18b, respectively, and spacer plates 22a and 22b space end closure plates 24a and 24b from the sealing plates 18a and 18b. It will be understood, of course, that although the laminated construction described above is preferred, the stator might be of suitably-apertured nonlaminated construction.

Rotor 10 is mounted on and is keyed to a main output shaft 26, which is suitably journaled in the stator laminations and extends outwardly through end closure plate 24a. In the smaller circular openings 6, 7 and 8, in central lamination 3, are mounted sealing subrotors 28, 29 and 30, which are keyed, respectively, to similar shafts 32, 33 and 34 suitably journaled in the stator plates. Subrotors 28, 29 and 30 have cylindrically-surfaced exposed hub portions 28a, 29a, and 30a of the proper diameter to tangentially engage the outer cylindrical surfaces of vanes 11, 12, 13 and 14 of main rotor 10 so as to effect a seal at the points of tangency. Subrotors 28, 29 and 30 are also each formed with two vanes 28b, 29b and 30b, of cylindrical segmental shape, and of the proper diameter to sealingly engage the peripheral surfaces of the recess smaller circular portions 6, 7 and 8 and to tangentially engage the cylindrical surface of main rotor body 10a so as to effect a seal at the points of tangency, the arcuate lengths of the outer surfaces of vanes 28b, 29b and 30b being substantially the same as the arcuate lengths of the rotor body surface between the adjacent vanes. Likewise, the arcuate lengths of the outer surfaces of rotor vanes 11, 12, 13 and 14 and the exposed surfaces of subrotor hub portions 28a, 29a and 30a are substantially the same.

Figure 1:
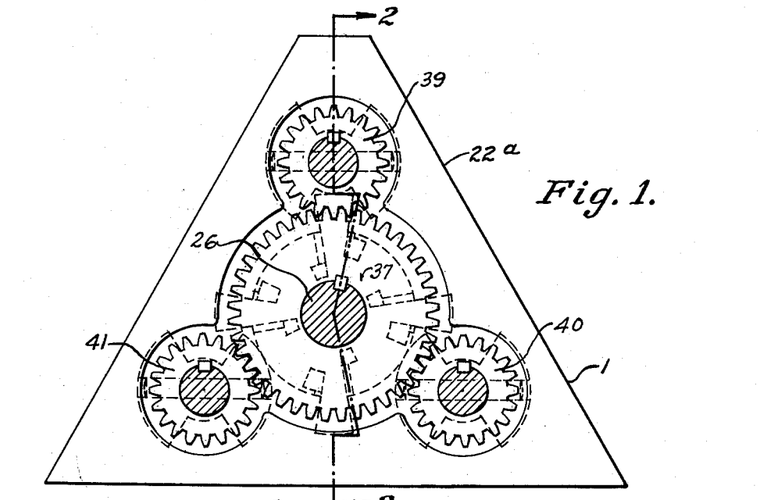
FIGURE 1 is a transverse vertical sectional view of the engine along line 1—1 of FIGURE 2.
Figure 2:
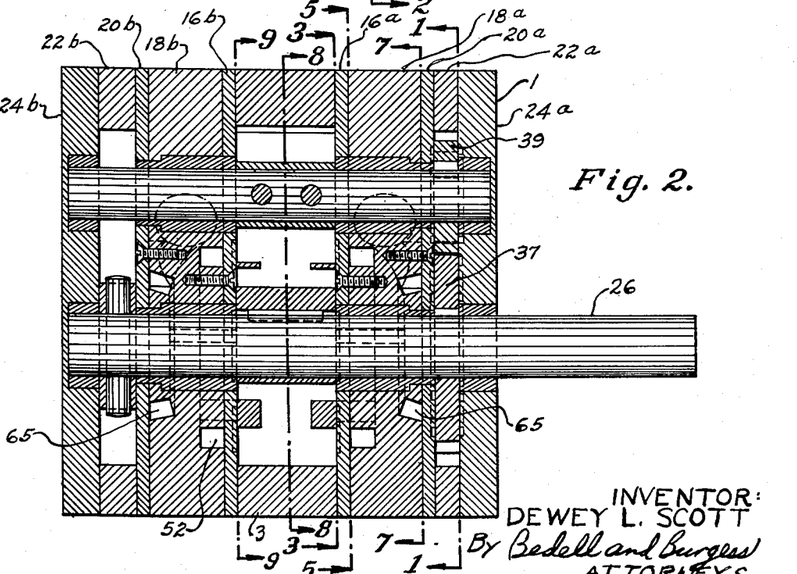
FIGURE 2 is a longitudinal vertical sectional view along line 2—2 of FIGURE 1.
Figure 3:
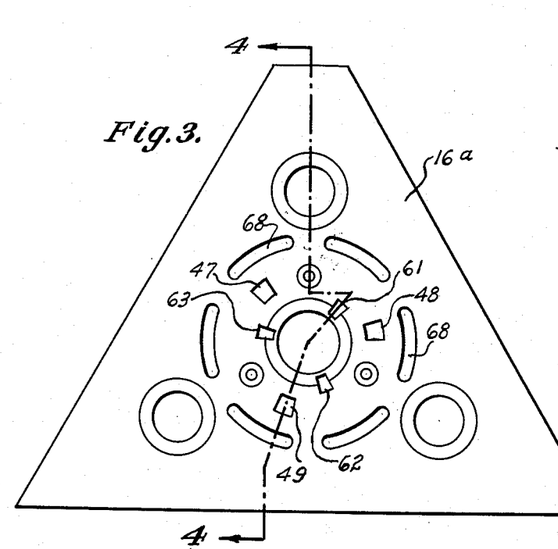
FIGURE 3 is a transverse vertical sectional view along line 3—3 of FIGURE 2.
Figure 4:
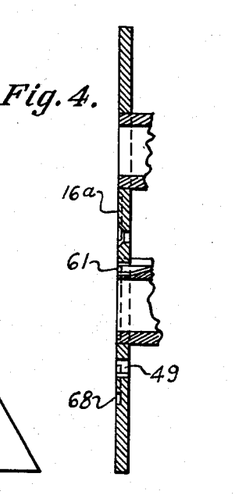
FIGURE 4 is a partial longitudinal vertical sectional view along line 4—4 of FIGURE 3.
Figure 5:
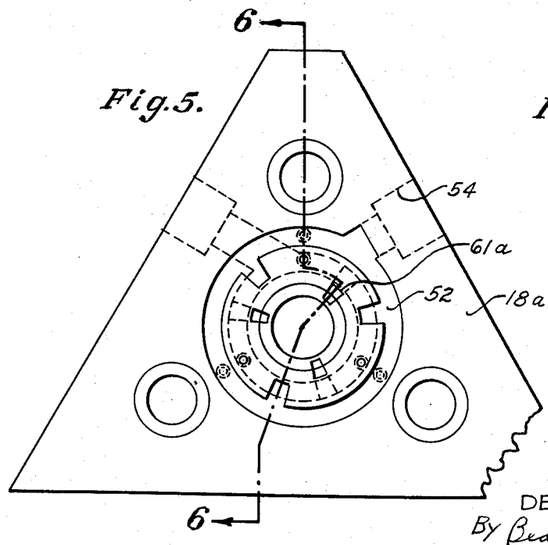
FIGURE 5 is a transverse vertical sectional view along line 5—5 of FIGURE 2.
Figure 6:
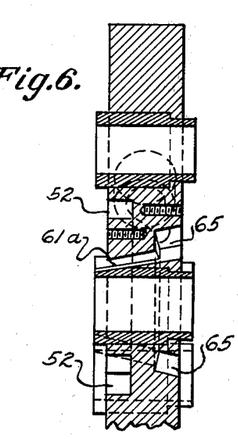
FIGURE 6 is a partial longitudinal vertical sectional view along line 6—6 of FIGURE 5.
Figure 7:
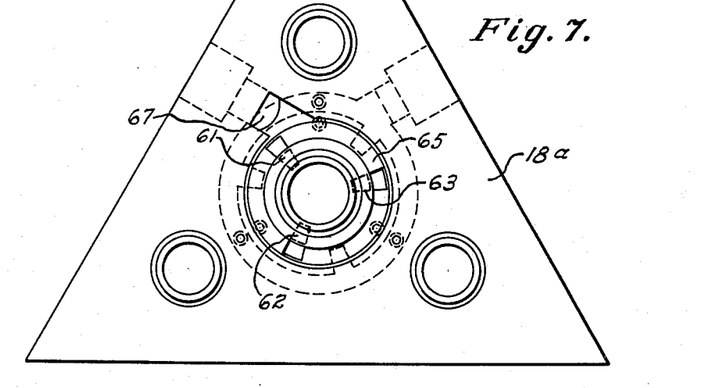
FIGURE 7 is a transverse vertical sectional view along line 7—7 of FIGURE 6.
Figure 8:
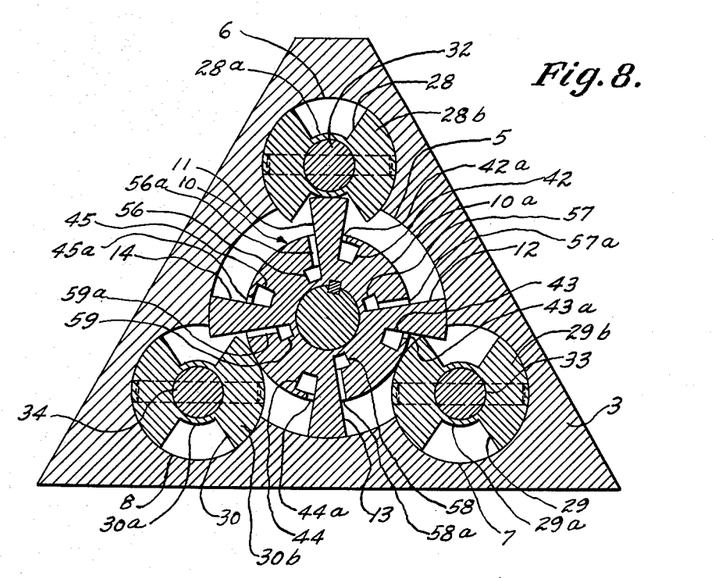
FIGURE 8 is a transverse vertical sectional view along line 8—8 of FIGURE 2.

In a trifoliate recess 36 formed by spacer plate 22a between plates 20a and 24a, as best seen in FIGURE 1, a large spur gear 37, keyed to main rotor shaft 16, meshes with smaller spur gears 39, 40 and 41, which are keyed to subrotor shafts 32, 33 and 34, respectively, the gear ratio being two to one, and the rotor and subrotors being synchronized so that their interfitting vanes mesh with each other, to form recesses bounded by the surfaces of main rotor body 10a, opening 5 in stator plate 3, the outer surfaces of the subrotor vanes, and plates 16a and 16b. These recesses are adapted, by the arrangement of valving as will be described hereinafter, to serve successively, and overlappingly, as pressure chambers, into which fluid under pressure is introduced successively, to bear against one of the rotor vanes and thus cause the rotor to rotate.

Fluid is introduced to the compression chambers by means of four passages of segmental shape 42, 43, 44 and 45, which extend longitudinally through the body of the rotor immediately rearwardly of the vanes 11, 12, 13 and 14; these passages communicate with the peripheral surfaces of the rotor body 10a by radial slots 42a, 43a, 44a and 45a, which intersect the rotor body periphery immediately rearwardly the adjacent vane.

Fluid is succesively introduced to passages 42, 43, 44 and 45 by means of three openings 47, 48 and 49 in plates 16a and 16b of similar cross section, equiangularly spaced about the axis of the rotor shaft and at the same radial distance therefrom as passages 42, 43, 44 and 45, the centers of openings 47, 48 and 49 being offset approximately 48° forwardly in a counterclockwise direction from the radii connecting the main rotor and subrotor axes so that as rotor 10 turns counterclockwise, the vanes of the subrotors will be in sealing engagement with rotor body 10a rearwardly of any of the intake passages 42, 43, 44 and 45 when that passage registers with one of the openings 47, 48, or 49. Openings 47, 48 and 49 extend through plates 16a and 16b and communicate, on the outer sides of these plates with circular recesses 52 in the adjacent faces of plates 18a and 18b, which, in turn communicate with radial fluid inlet passages 54 in plates 18a and 18b, by means of which pressurized fluid is introduced into the engine from an external source.

For discharging spent fluid from the compression chambers at atmospheric pressure, four passages 56, 57, 58 and 59 extend longitudinally through the rotor body immediately forward of the vanes, in the direction of rotation, and are at equal radii from the rotor axis, but closer to it than the fluid intake passages. Passages 56, 57, 58 and 59 communicate with the peripheral surfaces of the rotor body by means of radial passages 56a, 57a, 58a and 59a intersecting the peripheral surfaces immediately forward of the adjacent vanes.

Fluid is selectively withdrawn from passages 56, 57, 58 and 59 through three openings 61, 62 and 63 in plates 16a and 16b and registering passages 61a, 62a and 63a in plates 18a and 18b, which are equiangularly spaced about the axis of the rotor shaft and at the same distance therefrom as passages 56, 57, 58 and 59, the centers of openings 61, 62 and 63 being offset approximately 40° rearwardly of the radii connecting the rotor axis with the subrotor axes, so that, as the rotor turns counterclockwise, the vanes of the subrotors will be in sealing engagement forwardly of any of the rotor exhaust passages 56, 57, 58, 59, when that passage is in registry with one of the exhaust openings 61, 62, 63, thereby preventing communication between an intake passageway and the immediately following exhaust passageway, with consequent loss of pressure from the intake passageway. Passages 61, 62a and 63a communicate with a circular recess 65 in the outer faces of plates 18a and 18b, which, in turn discharge into outlet passages 67, communicating with the atmosphere.

Figure 21:
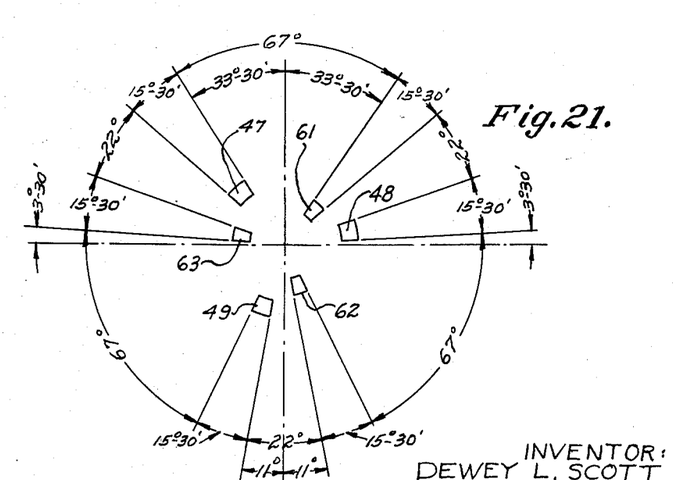
FIGURES 21, 22 and 23 are diagrammatic views showing the angular spacing, respectively, of the inlet and exhaust ports, the by-pass slots, and the intake and exhaust passageways in the rotor.
Figure 22:
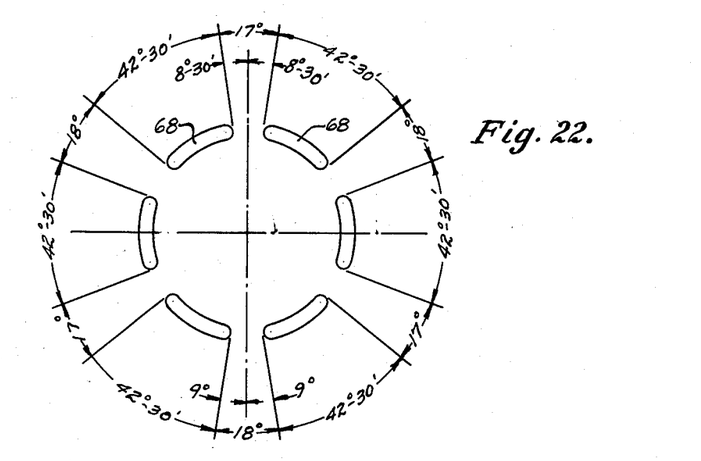
Figure 23:
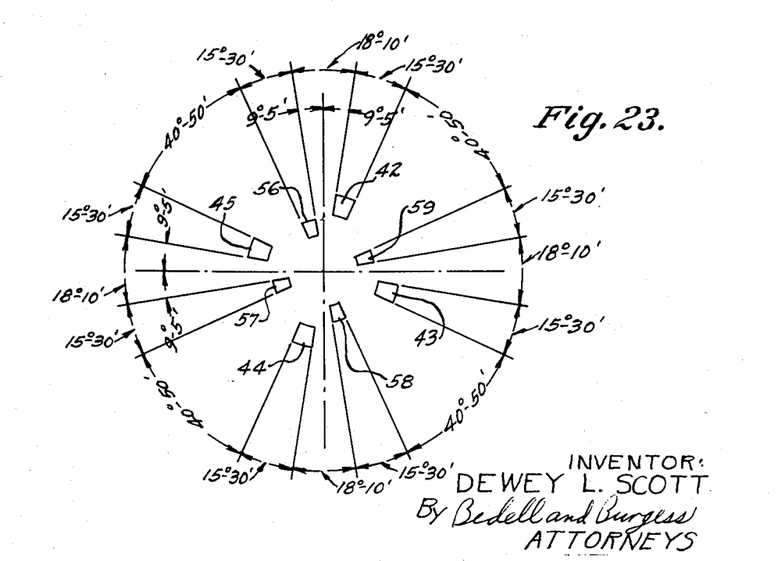

From a comparison of FIGURES 21 and 23, it will be seen that the remote edges of adjacent intake passages, e.g., 42 and 45, are 105° 30' apart, while the proximate edges of adjacent inlet ports, e.g., 48 and 47, are 104° 30' apart, thus providing an overlap of 1° and assuring that, as the rotor rotates, a fluid intake passageway and inlet port will always be in at least partial registry, so that the rotor will be subjected to fluid pressure at all times.

Circular intake and discharge recesses 52 and 65 are covered by the abutting surfaces of plates 20a.

Plates 16a and 16b are also formed with six arcuate by-pass slots 68 of equal length opening into the recess surrounding the rotor body 10a and spaced apart from each other a distance nearly equal to the thickness of the rotor vanes. These slots are arranged, with the leading ends of alternate slots substantially abreast of the inlet ports 47, 48 and 49, and trailing ends of the other slots substantially abreast of outlet ports 61, 62 and 63 so that while pressurized fluid is being admitted to the recess behind a rotor vane, irrespective of direction of rotation that vane will sealingly engage the surfaces of plates 16a and 16b between successive slots 68, but, when fluid ceases to enter the recess behind that vane, due to disalignment of the intake passageway and inlet port, the rear edge of that vane will uncover the rear end of the next slot, and any fluid in the recess ahead of that vane, which has not been carried off by the exhaust system will pass through the slots 68 around the vane and thus not exert any back pressure on the vane.

Figure 9:
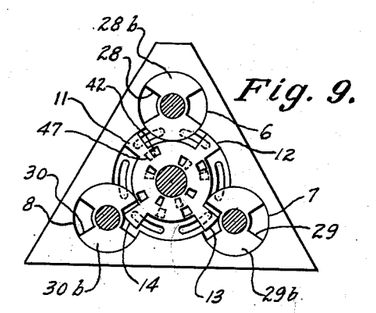
FIGURES 9–20 are transverse vertical sectional views along line 9—9 of FIGURE 2, showing various portions of the rotor and subrotors during a complete revolution.
Figure 10:
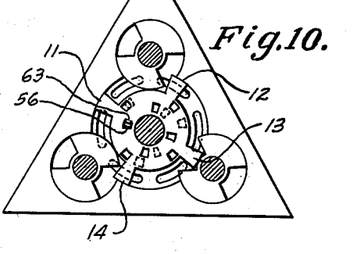

Operation of the engine will be best understood by reference to FIGURES 9 through 20. In FIGURE 9, the vanes 11, 14, 13 and 12 of the main rotor, reading counterclockwise from the vertical center line are approximately at the 45°, 135°, 225° and 315° positions, respectively, and rotor intake passage 42 is in partial registry with inlet ports 47 in plates 16a and 16b. Vane 28b of subrotor 28 and the peripheral surface of main rotor body 10a between vanes 11 and 12 are in tangent sealing relation with each other near their midpoints. Except for passage 42 and ports 47, all the other intake and discharge passages and ports are out of registry. Fluid under pressure is admitted from ports 47 to the space rearwardly of vane 11, causing the latter to move counterclockwise. As the rotor moves, exhaust passage 56, communicating with the space forwardly of vane 11, registers with exhaust ports 63 in plates 16a and 16b, as shown in FIGURE 10, thereby permitting discharge of the spent fluid from the space forwardly of vane 11.

Figure 11:
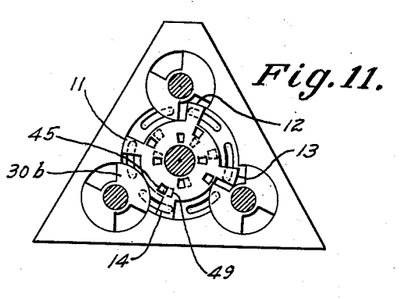
Figure 12:
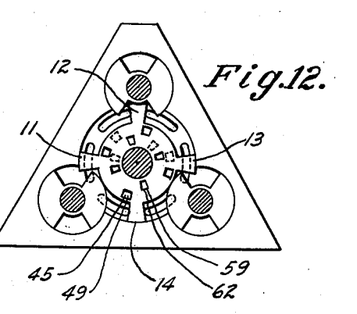
Figure 13:
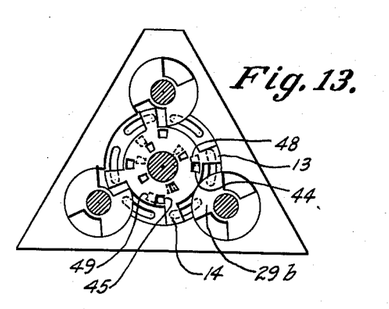
Figure 14:
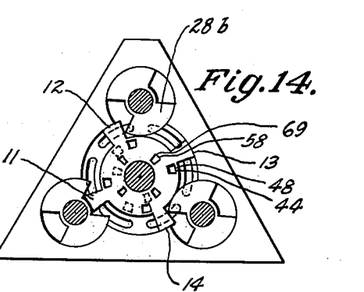
Figure 15:
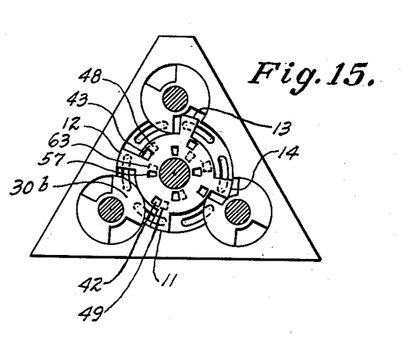
Figure 16:
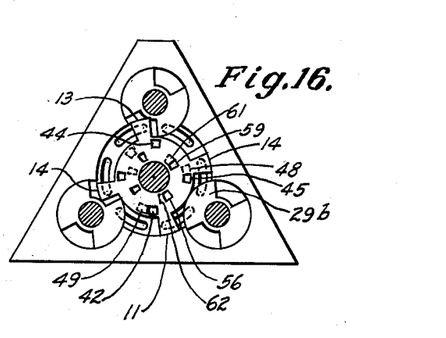
Figure 17:
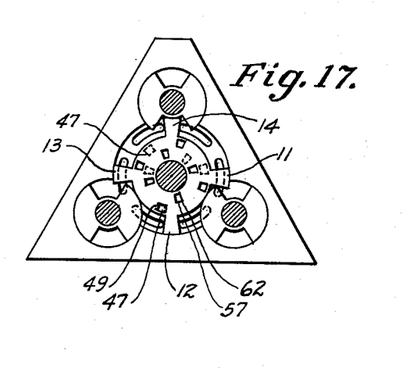
Figure 18:
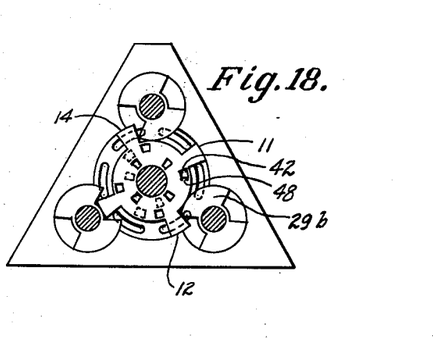

As the rotor continues to rotate, intake passageway 45 which feeds the chamber rearwardly of vane 14 begins to register with inlet ports 49, slightly before cessation of registration between intake passage 42 and inlet port 47, as shown in FIGURE 11. Fluid is thus admitted to the space formed rearwardly of vane 14 and forwardly of the cooperating subrotor vane 30b causing the rotor to move to the position shown in FIGURE 12, in which intake passage 45 is in full registry with ports 49 and exhaust passageway 59, for the space forwardly of vane 14, is in registry with exhaust ports 62. The pressure acting on the rear side of vane 14 causes the rotor to continue to rotate until passage 45 and ports 49 are nearly disaligned, at which time intake passage 44 adjacent vane 13 begins to register with inlet ports 48, thus admitting pressurized fluid to the space bounded by the rear edge of vane 13 and the peripheral surface of subrotor vane 29b, as shown in FIGURE 13. The pressure behind vane 13 causes the rotor to continue to move counterclockwise until intake passage 44 and inlet ports 48 are in full registry, as shown in FIGURE 14. At the same time exhaust passageway 58 and exhaust port 69 will be in registry, permitting the discharge of spent fluid from the space bounded on its rear by the forward edge of vane 13 and on the front by the peripheral surface of subrotor vane 28b. As long as passageway 44 and ports 48 are in even partial registry, pressure will, of course, continue to be exerted by the fluid against the rear edge of vane 13, causing the rotor to continue to rotate counterclockwise until passageway 43 adjacent the rear edge of vane 12 comes into registry with inlet ports 48, whereupon fluid pressure will be exerted against the rear edge of vane 12, causing the rotor to move toward the position shown in FIGURE 15 in which intake passage 43 and inlet ports 48 are nearly disaligned and intake passage 42 adjacent vane 11 and inlet ports 49 are about to become aligned, the spent fluid having been discharged from the space forwardly of vane 12 during the registry of exhaust passageway 57 and exhaust ports 63. As intake passageway 42 and inlet ports 49 become aligned, pressure on the rear face of vane 11 caused by the fluid in the space between vane 11 and the adjacent peripheral surface of subrotor vane 30b causes the rotor to continue to rotate to the position shown in FIGURE 16, in which passageway 42 is approaching disalignment from inlet ports 49, exhaust passage 56 is approaching disalignment from exhaust ports 62, most of the fluid in the space immediately forward of vane 11 and rearwardly of subrotor vane 29b having been discharged, and intake passageway 45 is approaching registry with inlet ports 48, so that when passageway 42 and ports 49 are entirely disaligned from each other, intake passageway 45 and inlet ports 48 will be in partial registry to introduce pressurized fluid into the space between the rear edge of vane 14 and the adjacent peripheral surface of subrotor vane 29b. At the same time exhaust passageway 59 adjacent the forward edge of vane 14 will commence to register with inlet ports 61 so as to permit the discharge of spent fluid from the space between vanes 12 and 13. As the rotor continues to turn counterclockwise, intake passageway 44 adjacent the rear edge of vane 13 comes into registry with inlet ports 47, and exhaust passageway 58 adjacent the forward edges of vane 13 comes into registry with exhaust port 63, causing continuation of the counterclockwise movement of the rotor, in the course of which, as intake passageway 44 approaches disalignment with inlet ports 47, intake passageway 43 adjacent the forward edge of vane 12 comes into registry with inlet ports 49, so that pressurized fluid is introduced into the space behind vane 12, as seen in FIGURE 17 causing continuation of the counterclockwise rotor movement. At the same time spent fluid ahead of vane 12 is discharged through registering exhaust passageway 57 and ports 62. As passageway 43 approaches disalignment from ports 49, passage 42 rearwardly of vane 11 commences to register with inlet ports 48, and exhaust passageway 56 ahead of vane 11 registers with exhaust port 61, as seen in FIGURE 18, thereby discharging the spent fluid from the space ahead of vane 11.

Figure 19:
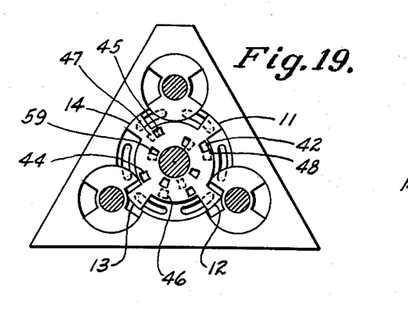
Figure 20:
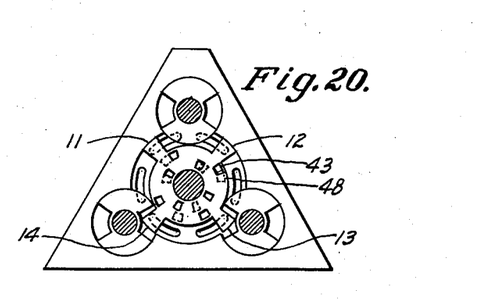

The fluid pressure on the rear face of vane 11 causes continuation of the counterclockwise movement of the rotor, and prior to the disalignment of intake passageway 42 and inlet ports 48, as shown in FIGURE 19, intake passageway 45 adjacent the rear face of vane 14 comes into partial registry with inlet ports 47, whereby the rotor continues its counterclockwise movement, fluid behind subrotor vane 28b being discharged through register exhaust passage 56 and ports 61. Before intake passage 45 becomes entirely disaligned from inlet ports 47, intake passage 44 will be in partial registry with inlet ports 46, and exhaust passageway 59 will have begun to register with exhaust ports 63. Similarly, by the time intake passageway 44 and inlet ports 46 have become disaligned, the rotor will have continued its counterclockwise movement until intake passageway 43 and inlet ports 48 are partially aligned, whereby fluid is introduced behind vane 12, causing movement of the rotor to the position shown in FIGURE 20, wherein it will be seen that, before passageway 43 and port 48 become disaligned, intake passageway 42 and port 45 will again be partially aligned, the rotor having made a full revolution from the position illustrated in FIGURE 9.

The engine may be reversed by using the exhaust system as an intake system, and the intake system as an exhaust system.

The structural features of the invention may be modified without departing from the spirit of the invention and the exclusive use of those modifications as come within the scope of the appended claims is contemplated.

What is claimed is:

1. A rotary engine comprising a stator having a recess therein, a rotor rotatably received within said recess in sealing engagement with the ends thereof and having a body of less diameter than said recess and four equally spaced vanes in sealing engagement with the periphery of said recess, for equiangularly spaced passageways extending longitudinally through said rotor and each communicating with the periphery of said rotor body at the same side of each of said vanes, three equiangularly spaced ports in an end of said recess and at the same radius from the rotor axis as said passageways, the remote sides of adjacent passageways being spaced farther apart than the proximate sides of adjacent ports whereby at least some of said ports and passageways are always in registration with each other, said ports being connected to a source of pressurized fluid, and means for blocking the individual spaces between adjacent vanes during registry of corresponding passageways and ports.

2. A rotary engine comprising a stator having a recess therein, a rotor rotatably received within said recess in sealing engagement with the ends thereof and having a body of less diameter than said recess and four equally spaced vanes in sealing engagement with the periphery of said recess, a group of four equiangularly spaced passageways extending longitudinally through said rotor and each communicating with the periphery of said rotor body at the same side of each of the vanes, an additional group of four passageways extending longitudinally through said rotor at a different radius from said rotor axis than said first-named passageways and each communicating with the periphery of said rotor body at the opposite side of each of the vanes from said first-named passageways, a group of three equiangularly spaced ports in an end of said recess at the same radius from the rotor axis as said first-named passageways and adapted for overlapping successive registry with said first-named passageways during rotation of said rotor, an additional group of three equiangularly spaced ports in the ends of said recess at the same radius as said additional passageways and spaced circumferentially of the recess from said first-named ports, said groups of ports being selectively communicable individually with a source of pressurized fluid and a discharge outlet, and means for blocking the individual spaces between adjacent vanes during registry of said passageways and said ports.

3. A rotary engine comprising a stator with a recess therein having end walls and side wall structure comprising a circular central portion with three equally spaced circular portions positioned around said central portion and intersecting its periphery, a rotor rotatably received within said recess with its ends in sealing engagement with the end walls of said recess and having a body of substantially less diameter than said central portion, and four equally spaced vanes in sealing engagement with the periphery of said central portion, a subrotor rotatably received within each of said peripheral circular portions and having a hub adapted to tangentially engage the periphery of said rotor vanes and vanes thereon adapted to tangentially engage the periphery of said rotor body substantially throughout the arc between adjacent rotor vanes, four intake passageways extending longitudinally through said rotor each with its forward edge adjacent the rear edge of one of said rotor vanes with respect to the normal direction of rotation and communicating with the exterior of said rotor body immediately rearwardly of the adjacent vane, three equally spaced inlet ports in a transverse wall of said stator adapted for connection to a source of pressurized fluid and adapted for overlapping successive registry with said rotor intake passageways during rotation of said rotor, the remote sides of adjacent rotor intake passageways being spaced farther apart than the proximate sides of said stator inlet ports whereby pressurized fluid is constantly admitted to the recess surrounding said rotor body throughout the rotation of said rotor.

4. A rotary engine comprising a stator with a recess therein having end walls and side wall structure comprising a circular central portion with three equally spaced circular portions positioned around said central portion and intersecting its periphery, a rotor rotatably received within said recess with its ends in sealing engagement with the end walls of said recess and having a body of substantially less diameter than said central portion, and four equally spaced vanes in sealing engagement with the periphery of said central portion, a subrotor rotatably received within each of said peripheral circular portions and having a hub adapted to tangentially engage the periphery of said rotor vanes and vanes thereon adapted to tangentially engage the periphery of said rotor body substantially throughout the arc between adjacent rotor vanes, four intake passageways extending longitudinally through said rotor each with its forward edge adjacent the rear edge of one of said rotor vanes with respect to the normal direction of rotation and communicating with the exterior of said rotor body immediately rearwardly of the adjacent vane, three equally spaced inlet ports in a transverse wall of said stator adapted for connection to a source of pressurized fluid and adapted for overlapping successive registry with said rotor intake passageways during rotation of said rotor, the remote sides of adjacnet rotor intake passageways being spaced farther apart than the proximate sides of said stator inlet ports whereby pressurized fluid is constantly admitted to the recess surrounding said rotor body throughout the rotation of said rotor, four exhaust passageways extending longitudinally through said rotor each with its rear edge adjacent the forward edge of said rotor vanes with respect to the direction of rotation, three equally spaced exhaust ports in a transverse wall of said stator and adapted for successive registry with said exhaust passageways, said exhaust ports being spaced a slightly greater distance ahead of said inlet ports in the normal direction of rotation of said rotor.

5. A rotary engine comprising a stator with a recess therein having end walls and side wall structure comprising a circular central portion with three equally spaced circular portions positioned around said central portion and intersecting its periphery, a rotor rotatably received within said recess with its ends in sealing engagement with the end walls of said recess and having a body of substantially less diameter than said central portion, and four equally spaced vanes in sealing engagement with the periphery of said central portion, a subrotor rotatably received within each of said peripheral circular portions and having a hub adapted to tangentially engage the periphery of said rotor vanes and vanes thereon adapted to tangentially engage the periphery of said rotor body substantially throughout the arc between adjacent rotor vanes, four intake passageways extending longitudinally through said rotor each with its forward edge adjacent the rear edge of one of said rotor vanes with respect to the normal direction of rotation and communicating with the exterior of said rotor body immediately rearwardly of the adjacent vane, three equally spaced inlet ports in a transverse wall of said stator adapted for connection to a source of pressurized fluid and adapted for overlapping successive registry with said rotor intake passageways during rotation of said rotor, the remote sides of adjacent rotor intake passageways being spaced farther apart than the proximate sides of said stator inlet ports whereby pressurized fluid is constantly admitted to the recess surrounding said rotor body throughout the rotation of said rotor, said rotor being geared to said subrotors such that said rotor and subrotor vanes constantly mesh with each other throughout rotation of the rotor whereby the peripheries of said subrotor vanes form the rear walls of compression chambers behind said rotor vanes and seal said chambers from the exhaust passageways forwardly of the rotor vanes while pressurized fluid is being introduced to said chambers.

6. A rotary engine stator of laminated construction comprising a first plate forming a rotor-receiving recess, second plates abutting said first plate and enclosing said recess, a third plate having separate grooves in its opposite sides, separate openings in said second plate communicating individually with said separate grooves, and a fourth plate covering the groove in the side of said third plate remote from said second plate.

7. A rotary engine stator of laminated construction comprising a first plate forming a rotor-receiving recess, second plates abutting said first plate and enclosing said recess, a third plate having separate grooves in its opposite sides, separate openings in said second plate communicating individually with said separate grooves, and a fourth plate covering the groove in the side of said third plate remote from said second plate, a fifth plate forming a gear receiving recess, and a sixth plate covering the side of the recess remote from the fourth plate.

8. A rotary engine comprising a stator of laminated construction including a first plate forming a recess and second plates closing the ends thereof, a rotor rotatably received within said recess and having a body of less diameter than the recess and four equally spaced vanes in sealing engagement with the periphery of said recess, a group of four equiangularly spaced passageways extending longitudinally through said rotor and each communicating with the periphery of the rotor body at the same side of each of the vanes, an additional group of four passageways extending longitudinally through said rotor at a different radius than said first-named passageways and each communicating with the periphery of said rotor body at the opposite side of the vanes from said first-named passageways, a group of three equiangularly spaced openings in said second plate at the same radius from the rotor axis as said first-named passageways and adapted for overlapping successive registry with said first-named passageways during rotation of said rotor, an additional group of three equiangularly spaced openings in the same second plate, a third plate having separate grooves in its opposite sides, said first-named group of openings communicating with the groove at one side and said additional group of openings communicating with the groove at the opposite side, and a fourth plate covering said groove in the side of said third plate remote from said second plate.

9. A rotary engine comprising a stator of laminated construction including a first plate forming a trifoliate recess with a circular central portion and three equally spaced peripheral circular portions intersecting the periphery thereof and second plates closing the ends of said recess, a rotor rotatably received within said recess and having a body of less diameter than said recess central portion and four equally spaced vanes in sealing engagement with the periphery of said recess central portion, a subrotor rotatably mounted in each of said peripheral circular portions and having a pair of vanes in sealing engagement with the periphery of the peripheral circular portion and adapted to tangentially sealingly engage the periphery of the rotor body substantially throughout the distance between adjacent vanes, said subrotor having an exposed hub portion between its vanes adapted to tangentially sealingly engage the peripheries of the rotor vanes, a group of four equiangularly spaced passageways extending longitudinally through said rotor and each communicating with the periphery of the rotor body at the same side of each of the vanes, an additional group of four passageways extending longitudinally through said rotor at a different radius than said first-named passageways and each communicating with the periphery of said rotor body at the opposite side of the vanes from said first-named passageways, a group of three equiangularly spaced openings in a second plate at the same radius from the rotor axis as said first-named passageways and adapted for overlapping successive registry with said first-named passageways during rotation of said rotor, an additional group of three equiangularly spaced openings in the same second plate, a third plate having separate grooves in its opposite sides, said first-named group of openings communicating with the groove at one side and said additional group of openings communicating with the groove at the opposite side, and a fourth plate covering said groove in the side of said third plate remote from said second plate, said openings in said second plate being so positioned with respect to said recess peripheral circular portions that said passageways and corresponding openings communicating with the trailing side of said rotor vanes register as the trailing end of the subrotor vane approaches the leading side of the succeeding rotor vane and the passageways and corresponding openings communicating with the leading side of the rotor vanes register when the leading end of the subrotor vane departs from the trailing side of the preceding rotor vane.

10. A rotary engine comprising a stator having a trifoliate recess therein, a rotor rotatably mounted in the central portion of said recess and having four radial vanes in sealing engagement with the periphery of said central portion and a cylindrical body spaced inwardly from said periphery, subrotors rotatably mounted in the outer portions of said recess and each having a hub portion and vanes adapted to mesh in sealing engagement with said main rotor vanes and exposed body surfaces, first longitudinal passageways through said rotor body and communicating with the periphery thereof adjacent one side of each of said main rotor vanes, second longitudinal passageways through said rotor body at a different radius from said first passageways and communicating with the periphery thereof at the opposite side of said vanes from said first passageways, three openings in an end wall of said recess adapted to register with said first passageways while a vane of a subrotor is in engagement with an adjacent portion of the body of said rotor, three additional openings in an end wall of said recess adapted to register with said second passageways while a vane of a subrotor is in engagement with an adjacent portion of said rotor body, and means for selectively connecting said openings and additional openings to a source of pressurized fluid.

11. A rotary engine according to claim 12 in which an end wall of said recess radially outwardly of the body of said rotor is formed with six circumferentially-spaced arcuate slots, three of which have their leading ends, in a counterclockwise direction, substantially abreast of the leading edges of said first-named openings, and the other three of which have their leading ends, in a clockwise direction substantially abreast of the leading edges of said other openings, said slots being slightly longer than the thickness of said vanes whereby to permit the passages of unexhausted fluid ahead of each of the vanes around the vane and thus eliminate back pressure on the vane.

12. A rotary engine comprising a stator having a polyfoliate recess therein, a rotor rotatably mounted in the central portion of said recess and having a plurality of radial vanes in sealing engagement with the periphery of said central portion and a cylindrical body spaced inwardly from said periphery, subrotors rotatably mounted in the outer portions of said recess and each having a hub portion and vanes adapted to mesh in sealing engagement with said main rotor vanes and exposed body surfaces, first longitudinal passageways through said rotor body and communicating with the periphery thereof adjacent one side of each of said main rotor vanes, second longitudinal passageways through said rotor body at a different radius from said first passageways and communicating with the periphery thereof at the opposite side of said vanes from said first passageways, a plurality of openings in an end wall of said recess adapted to register with said first passageways while a vane of a subrotor is in engagement with an adjacent portion of the body of said rotor, a plurality of additional openings in an end wall of said recess adapted to register with said second passageways while a vane of a subrotor is in engagement with an adjacent portion of said rotor body, said first passageways and openings and said additional passageways and openings, respectively, being relatively spaced apart circumferentially to provide continually successive overlapping registry therebetween and means for selectively connecting said openings and additional openings to a source of pressurized fluid, an end wall of said recess radially outwardly of the body of said rotor being formed with a plurality of circumferentially-spaced arcuate slots, half of which have their leading ends, in a counterclockwise direction, substantially abreast of the leading edges of said first-named openings, and the other half of which have their leading ends, in a clockwise direction substantially abreast of the leading edges of said other openings, said slots being slightly longer than the thickness of said vanes whereby to permit the passage of unexhausted fluid ahead of each of the vanes around the vane and thus eliminate back pressure on the vane.

References Cited in the file of this patent
UNITED STATES PATENTS

| | | |
|---|---|---|
| 681,914 | Hicks | Sept. 3, 1901 |
| 864,889 | Edwards | Sept. 3, 1907 |
| 878,327 | Adams | Feb. 4, 1908 |
| 958,416 | Metcalf et al. | May 17, 1910 |
| 958,571 | Wickersham | May 17, 1910 |
| 1,009,405 | Gill | Nov. 21, 1911 |
| 1,269,735 | Ogden | June 18, 1918 |
| 1,272,876 | Tygard | July 16, 1918 |
| 2,177,977 | Brauer | Oct. 31, 1939 |
| 2,360,430 | Lear | Oct. 17, 1944 |
| 2,934,044 | Gilreath | Apr. 26, 1960 |